(12) United States Patent
Fitterer et al.

(10) Patent No.: US 9,330,088 B2
(45) Date of Patent: May 3, 2016

(54) PREVENTING FRUSTRATION IN ONLINE CHAT COMMUNICATION

(71) Applicant: International Business Machines Corporation, Armonk, NY (US)

(72) Inventors: Annemarie R. Fitterer, Austin, TX (US); Ramakrishna J. Gorthi, Pune, IN (US); Chandrajit G. Joshi, Pune, IN (US); Romil J. Shah, Pune, IN (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 13/868,137

(22) Filed: Apr. 23, 2013

(65) Prior Publication Data

US 2014/0316765 A1    Oct. 23, 2014

(51) Int. Cl.
*G06F 17/27* (2006.01)
*G06F 17/21* (2006.01)

(52) U.S. Cl.
CPC ............ *G06F 17/2775* (2013.01); *G06F 17/21* (2013.01); *G06F 17/2735* (2013.01)

(58) Field of Classification Search
CPC ..... G10L 25/63; G06F 17/27; G06F 17/2765; G06F 17/2795; G06F 17/2735; G06F 17/2775; H04L 51/12
USPC ............. 704/1, 9, 10, 231, 251, 252; 715/758
See application file for complete search history.

(56) References Cited

U.S. PATENT DOCUMENTS

| | | | |
|---|---|---|---|
| 6,721,704 B1 | 4/2004 | Strubbe et al. | |
| 7,599,475 B2 | 10/2009 | Eilam et al. | |
| 7,940,186 B2 | 5/2011 | Aaron et al. | |
| 8,000,969 B2 | 8/2011 | Da Palma et al. | |
| 8,010,615 B2 | 8/2011 | Jimenez et al. | |
| 8,731,918 B2 | 5/2014 | Wasserblat et al. | |
| 8,769,028 B2* | 7/2014 | Herold | G06Q 10/10 709/206 |
| 2004/0111479 A1 | 6/2004 | Borden et al. | |
| 2008/0168095 A1* | 7/2008 | Larcombe | G06F 21/316 707/999.107 |
| 2009/0002178 A1 | 1/2009 | Guday et al. | |
| 2009/0063154 A1 | 3/2009 | Gusikhin et al. | |
| 2009/0077130 A1 | 3/2009 | Abernethy, Jr. et al. | |

(Continued)

FOREIGN PATENT DOCUMENTS

| | | |
|---|---|---|
| WO | 2009072133 A2 | 6/2009 |
| WO | 2011142898 A1 | 11/2011 |

OTHER PUBLICATIONS

Fabri et al., "Is Empathy the Key? Effective Communication via Instant Messaging," Proceedings of 11th EATA International Conference on Networking Entities, Oct. 2005, St. Polten, Austria.

(Continued)

*Primary Examiner* — Martin Lerner
(74) *Attorney, Agent, or Firm* — Stephen Yoder (57) ABSTRACT

Monitoring an internet chat in which a text transcript is generated by at least two chat participants, by: (i) performing a simple check on the text transcript for existence of a potential frustration precondition; and (ii) on condition that a frustration precondition is found, performing text analytics type analysis on the text transcript to determine whether potential frustration is evidenced by the text transcript. If it is determined that potential frustration is evidenced by the chat transcript then responsive action is taken to prevent and/or stem the frustration.

19 Claims, 7 Drawing Sheets

(56) References Cited

U.S. PATENT DOCUMENTS

| | | |
|---|---|---|
| 2009/0144366 A1 | 6/2009 | Lyle |
| 2009/0280909 A1 | 11/2009 | McEniry |
| 2010/0205541 A1* | 8/2010 | Rapaport ............... G06Q 10/10 715/753 |
| 2011/0010173 A1 | 1/2011 | Scott et al. |
| 2011/0113112 A1* | 5/2011 | Ganz ................... G06F 17/2765 709/206 |
| 2011/0125852 A1 | 5/2011 | Wolfe |
| 2011/0270613 A1 | 11/2011 | Da Palma et al. |
| 2011/0279359 A1 | 11/2011 | McCarty |
| 2012/0023113 A1 | 1/2012 | Ferren et al. |
| 2013/0124192 A1* | 5/2013 | Lindmark ............. G06F 17/274 704/9 |
| 2014/0114895 A1 | 4/2014 | Beechum et al. |
| 2014/0163961 A1 | 6/2014 | Whitten et al. |
| 2014/0280638 A1* | 9/2014 | O'Dell .................... H04L 51/12 709/206 |
| 2014/0316767 A1 | 10/2014 | Fitterer et al. |
| 2014/0362738 A1 | 12/2014 | Neystadt et al. |
| 2015/0180746 A1* | 6/2015 | Day, II ................... H04L 51/16 455/405 |

OTHER PUBLICATIONS

"Part of Speech (PoS) Tagging and Sentiment Bearing Phrases", Lexalytics, downloaded on Mar. 8, 2013, <http://www.lexalytics.com/technical-info/pos-tagging-and-sentiment-bearing-phrases>.

"Salience Engine", Lexalytics, <http://www.lexalytics.com/technical-info/salience-engine-for-text-analysis>, Date: as of Feb. 28, 2013 by DBW.

"Sentiment Extraction: Measuring the Emotional Tone of Text", Lexalytics, downloaded on <Mar. 8, 2013, <http://www.lexalytics.com/technical-info/sentiment-analysis-measuring-emotional-tone>.

"Visual Text Overview", Text Analysis International, Inc., Date: as of Feb. 28, 2013 by DBW, <http://www.textanalysis.com/Products/VisualText/visualtext.html>.

* cited by examiner

A: I am hitting an error in my test environment and I'm not sure what to do next. I was hoping you could help.
B: What are you trying to do?
A: I rebooted my system and now my ldap server won't start.
B: Please send me the server log files.
A: It was working fine before I rebooted. I have no idea why it stopped working.
B: Please send me the server log files.
   [Chat administration for B sends a message: Offer an explanation of how these log files will help diagnose the error.]
A: Which logs?
   [Chat Administration for A sends a message: Ask for clarification on where to find these logs]
B: The server log files. These logs contain messages which should help indicate what is happening. Typically when the server fails to start after a reboot it is because a password has expired. These logs will confirm whether or not this is the case or if there is another problem occurring.
A: I am not sure where the log files are located, can you tell me where to look?
B: Sure, these logs are located in the instance home/logs directory.
A: Great I will collect those now.

FIG. 5A     600a

A: Let's talk about potential prior art. Does the Smith reference pre-empt your invention?
B: It's not prior art.
A: Does the Jones reference pre-empt your invention?
B: It's not prior art.
A: How about the Wilson reference?
B: It's not prior art.
   [CHAT ADMIN S/W recognizes context of repetition and does not intervene]
A: I am glad that patent protection may be possible.

PREVENTING FRUSTRATION IN ONLINE CHAT COMMUNICATION

FIELD OF THE INVENTION

The present invention relates generally to the field of online chat sessions, and more particularly to mood detection and response to promote effective communication in online chat sessions.

BACKGROUND OF THE INVENTION

Computer-mediated communication (CMC) is a communicative transaction that occurs over a network. CMC is divided into synchronous and asynchronous types.

Asynchronous computer-mediated communication (ACMC) refers to a type of communication where the communicators (often referred to herein as "users," see Definitions, below) are not assumed to all be online, actively connected to the communication network, at the same time. Because not all users are online at the same time, in ACMC, successive communications are generally subject to significant time delays, with the time delays being caused by the hardware/software of the communication system and/or the manner in which users use the communication system. One familiar example of ACMC is e-mail communication systems.

Synchronous computer-mediated communication (SCMC) refers to a type of communications where at least two of the communicators are online at the same time. One familiar example is a real-time online chat session (for example, an internet relay chat (IRC) chat session. One type of SCMC is chat-protocol-based synchronous computer-mediated communication (CPSCMC), which are based on protocols designed for the purpose of implementing real-time (see Definitions, below) chat sessions. In the art of SCMC, it is known a communicator will sometimes express her emotions to other communicator(s) through one or more of the following ways: (i) the substance of their writing (for example, use of the phrase "I wub u" to indicate love); (ii) the punctuation of their writing (for example, use of ALL CAPS text to indicate vexation); (iii) the formatting of their writing (for example, underlining to indicate urgency); and/or (iv) emoticons (for example, the characters ":7 (" to indicate sadness through a sideways frowny face).

Some remarks to avoid confusion on terminology will now be set forth in this paragraph. The term of art "computer-mediated communication" (and SCMC and ACMC) should not be taken to imply any person or software necessarily plays the role of a "mediator" in the communications. Rather, in the art, "computer-mediated communication" is understood to be communications that are merely implemented by, and over, computer systems. In CMC (as in traditional face-to-face communications between humans) there certainly can be a person who plays the traditional role of a "mediator," but this is not what the word "mediated" in the phrase "computer-mediated communication" means or implies. In other words CMC sessions don't necessarily, and usually do not, have any sort of entity that actively tries to get the relevant parties to come to any kind of agreement with respect to the subject matter of the CMC communications.

There currently exists software for determining (or at least attempting to determine) a writer's mood based on the writer's natural language writings. The input data is parsed and processed to select writing-related data relevant to the writer's mood. For example, some conventional text analytics engines include mood determination software.

SUMMARY

According to an aspect of the present invention, there is computer program product, for monitoring a synchronous computer-mediated communication (SCMC) in which a text transcript is generated by at least two chat participants. The product includes software stored on a software storage device. The software includes: (i) first program instructions programmed to set up and maintain an SCMC communication system between a plurality of chat participants; and (ii) second program instructions programmed to check for potential frustration. The software is stored on a software storage device in a manner less transitory than a signal in transit.

According to another aspect of the present invention, there is a method of monitoring a synchronous computer-mediated communication (SCMC) in which a text transcript is generated by at least two chat participants. The method includes: (i) performing a simple check on the text transcript for existence of a potential frustration precondition; and (ii) on condition that a frustration precondition is found at the performing-a-simple-check step, performing text analytics analysis on the text transcript to determine whether potential frustration is evidenced by the text transcript. The performing-a-simple-check step and the performing-text-analytics-type-analysis steps are performed by the computer system running under software control.

According to other aspects of the present invention, the method includes: (i) on condition that potential frustration is determined at the performing-text-analytics-analysis step, taking a responsive action designed to minimize or prevent frustration on the part of the chat participants; (ii) the responsive action in (i) further includes at least one of the following: (a) automatically, and under software control, making a suggestion to at least one of the chat participants with respect to how the communication may be conducted; and/or (b) automatically, and under software control, taking direct action; (iii) the performing-a-simple-check step includes the sub-step of checking a set of at least one dictionary(ies) for use, in the text transcript, of one or more key phrase(s) that are frustration preconditions; (iv) the set of at least one dictionary(ies) in (iii) includes at least one dictionary that is customizable by at least one chat participant; (v) the performing-a-simple-check step includes the sub-step of checking for some threshold amount of repetition of language in the text transcript, with the threshold amount of repetition being a frustration precondition; and/or (vi) the performing-a-simple-check step comprises the sub-step of checking meta-text in the text transcript for meta-text corresponding to a predetermined frustration precondition.

DETAILED DESCRIPTION

The DETAILED DESCRIPTION section will be divided into the following sub-sections: (i) The Hardware and Software Environment; (ii) Operation of Embodiment(s) of the Present Invention; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
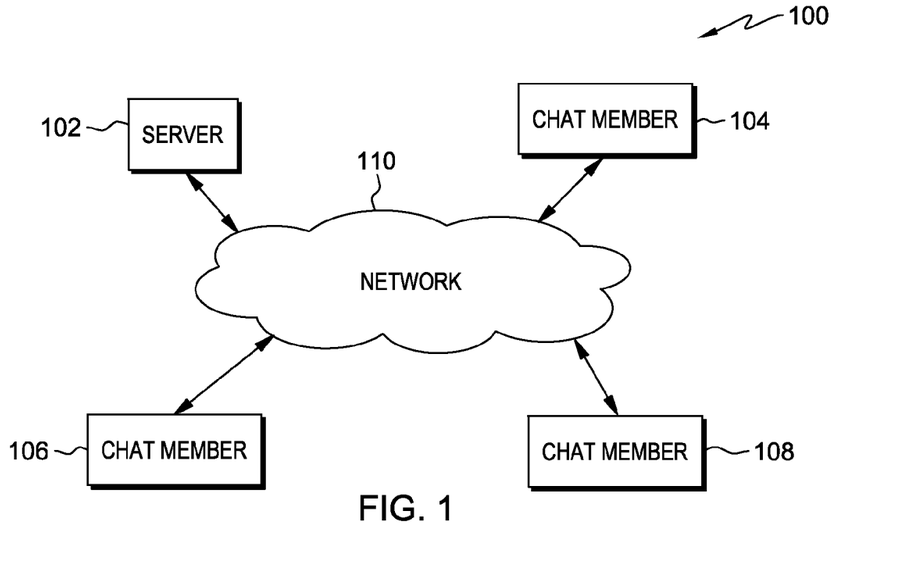
FIG. 1 is a schematic view of a first embodiment of a system of computers (also referred to as a computer system) according to the present invention.
Figure 2A:
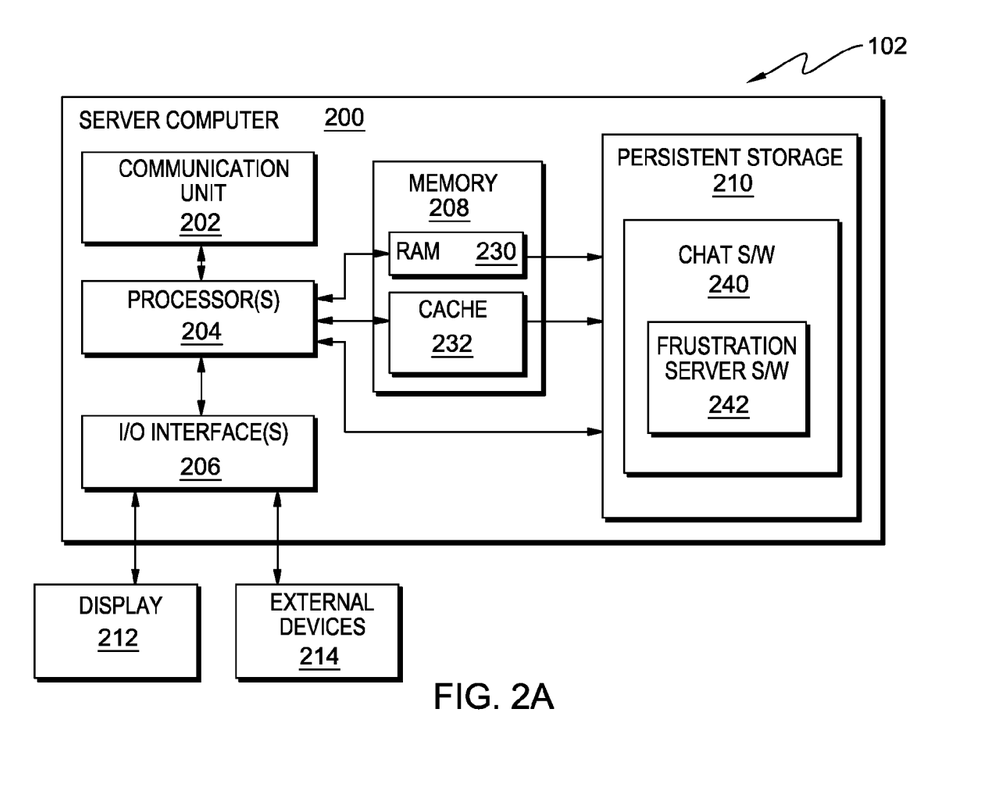
FIG. 2A is a schematic view of a server computer sub-system portion of the first embodiment computer system.
Figure 2B:
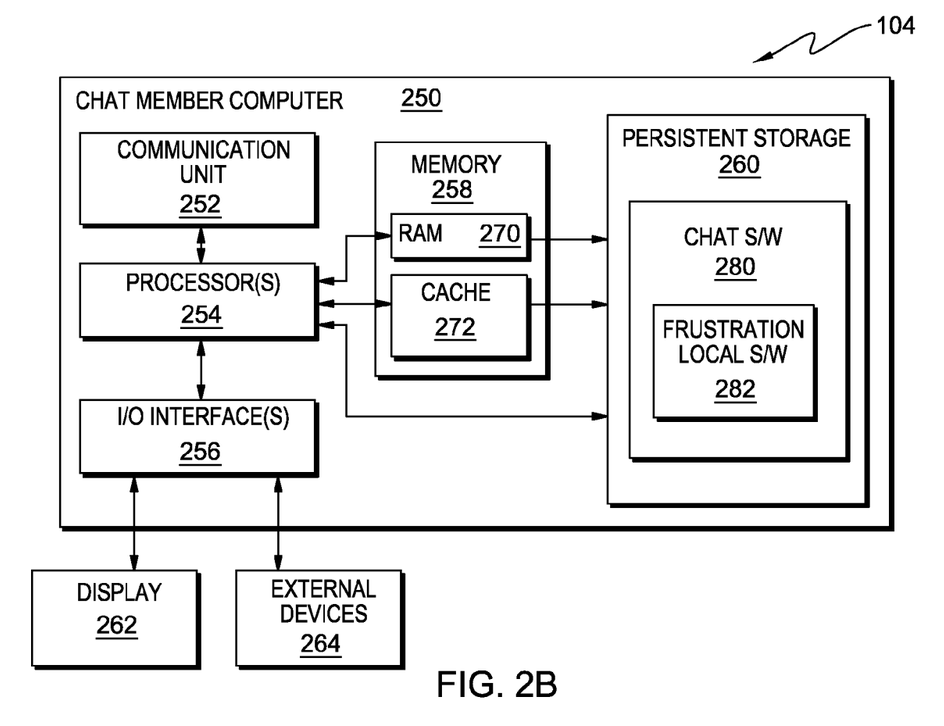
FIG. 2B is a schematic view of a chat member computer sub-system portion of the first embodiment computer system.

A hardware and software environment suitable for implementation of some embodiments of the present invention will now be described in detail with reference to the Figures. FIGS. 1, 2A, and 2B collectively make up a functional block diagram of distributed data processing system (also called computer system) 100, including: chat server computer sub-system 102; chat member computer sub-systems 104, 106, and 108; data communication network 110; chat server computer 200; communication unit 202; processor(s) 204; memory component 208; RAM (random access memory) component 230; cache 232; persistent storage component 210; chat software 240; frustration server software 242; I/O (input/output) interface(s) 206; display device 212; external devices 214; chat member computer 250; communication unit 252; processor(s) 254; memory component 258; RAM component 270; cache 272; persistent storage component 260; chat software 280; frustration local software 282; i/o interface(s) 256; display device 262; and external devices 264.

Chat software 240, chat software 280, and their various constituent modules implement synchronous computer-mediated communication (SCMC) system according to an embodiment of the present invention. This will be discussed in detail in the next sub-section of this DETAILED DESCRIPTION section. For the rest of this sub-section, the hardware and software environment, in which software 240, 280 operates, will be discussed in detail. In many respects, chat server sub-system 102 is representative of the various computer sub-systems of the present invention. Therefore, this discussion of the hardware and software environment will focus on the various components of sub-system 102.

While chat server sub-system 102 is used herein as a representative and explanatory embodiment, a computer sub-system of the present invention may alternatively be a laptop computer, tablet computer, netbook computer, personal computer (PC), a desktop computer, a smart phone, a personal digital assistant (PDA), or any programmable electronic device capable of communicating with the client sub-systems via network 110. As shown in FIG. 2A, chat software 240 is a collection of machine readable instructions and data that is used to manage and control the network of multiple client devices of system 100. Many portions of chat software 240 are conventional, but some inventive aspects of chat software 240 (and especially its frustration server software 242) will be discussed in detail below.

Similar to chat server sub-system 102, chat member sub-system 104 is a general purpose computer sub-system. The similarities will become apparent in further discussion of chat server sub-system 102, below.

Moving back to chat server sub-system 102 shown in FIG. 1, network 110 can be, for example, a local area network (LAN), a wide area network (WAN) such as the internet, or a combination of the two, and can include wired, wireless, or fiber optic connections. In general, network 110 can be any combination of connections and protocols that will support communications between server and client sub-systems.

It should be appreciated that FIGS. 1, 2A, and 2B, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

Turning again to FIG. 2A, chat server sub-system 102 is shown as a block diagram with many double arrows. These double arrows (no separate reference numerals) represent a communications fabric, which provides communications between various components of sub-system 102 as shown in FIG. 2A. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Chat software 240 and frustration server software 242 are stored in persistent storage 210 for access and/or execution by one or more of the respective computer processor(s) 204, usually through one or more memories of memory 208. Persistent storage 210 is at least more persistent than a signal in transit is, but the persistent storage may, of course, be substantially less persistent than permanent storage. Chat software 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to chat server sub-system 102, such as chat member sub-systems 104, 106, and 108. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with chat server computer 200. For example, I/O interface 206 provides a connection to external device set 214. External device set 214 will typically include portable computer-readable storage media such as, for example, thumb drives, portable optical or magnetic disks, and memory cards. Software and data used to practice embodiments of the present invention, for example, chat software 240, can be stored on such portable computer-readable storage media. In these embodiments the relevant software may (or may not) be loaded, in whole or in part, onto persistent storage device 210 via I/O interface(s) 206. I/O interface(s) 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Operation of Embodiment(s) of the Present Invention

The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3A:
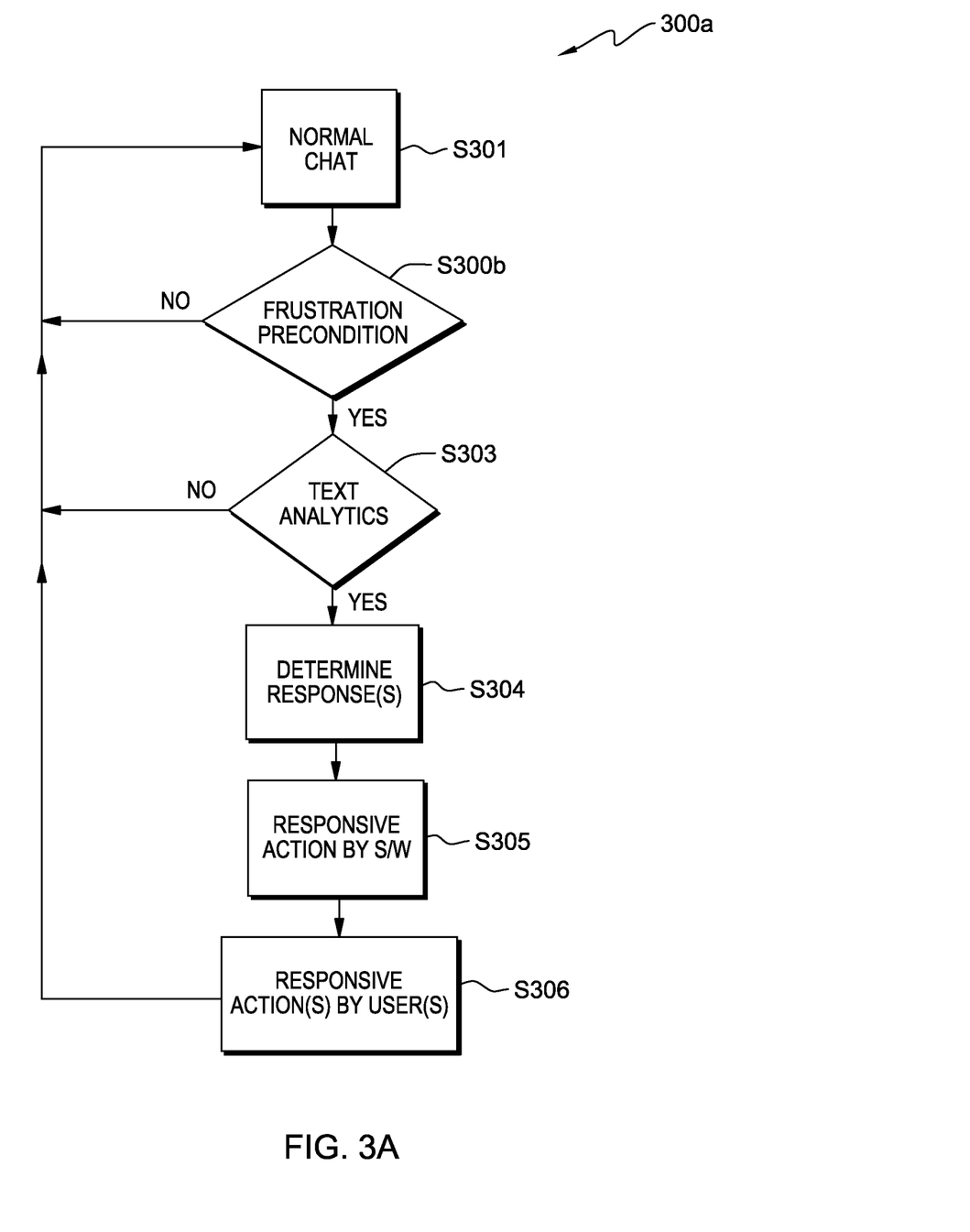
FIG. 3A is a flowchart showing a process according to an embodiment of the present invention.

FIG. 3A is a flowchart depicting process 300a in accordance with an embodiment of the present invention. The various steps of process 300a will now be discussed in turn.

Process 300a begins at step S301, where various chat member computer sub-systems 104, 106, and 108 (see FIG. 1) communicate over network 110 as a number of users, or chat participants, are engaged in CPSCMC in the form of a real-time chat session. Real-time chat sessions provide users an opportunity to communicate in real-time via a text-based dialog box that: (i) shows up on their respective screens; and (ii) allows them to communicate through text entered through their respective input devices (for example, keyboard, mouse, touch screen, talk-to-text input sub-system, etc.). There are many CPSCMC systems (now known and to be developed in the future) respectively designed and tailored for communication in a diverse variety of social and/or business settings. CPSCMC is also being adopted by multi-national business organizations. The use of CPSCMC can expand an individual employee's real-time influence beyond the physical walls of an office building to effectively convert the employee's office into a virtual office having global reach. CPSCMC allows users to effectively break through geographic barriers to communication, but this can expose differences between the communicators including differences in: (i) most fluent language; and (ii) culture.

Chat sessions generally lack useful indicators of mood available during oral and/or face-to-face discussions such as: (i) facial expressions; (ii) voice intonations; (iii) speaking speed; (iv) speaking volume; and/or (v) hand gestures. Misunderstandings during real-time chat often lead to stalled discussions, which can delay projects and create new barriers between users. Some embodiments of the present invention work to detect potential for frustration (also herein called simply "frustration") before the potential for frustration leads to stronger and more definite negative emotions such as: (i) anger; (ii) discomfort; (iii) confusion; (iv) disappointment; (v) apathy; (vi) depression; (vii) lethargy; (viii) melancholy; (ix) stubbornness; (x) non-communicativeness; and/or (xi) vexation. In the discussion below of an embodiment of the present invention, detection of the mood of potential frustration (of, simply, frustration) and subsequent intervention is discussed in detail.

Process 300a proceeds to step S300b (shown as a block in FIG. 3A and in more detail in FIG. 3B), where detect frustration precondition modules 404, 504 (see FIGS. 4A and 4B) determine whether a frustration precondition appears in the text of the ongoing chat taking place in step S301. A frustration precondition is a text-based indication that one or more of the chat participants may be frustrated. Text-based signals include: (i) key phrases; (ii) meta-texts (as the term "meta-text" will be explained, below); and/or (iii) repetition. These frustration preconditions are simple and quick to detect so that this detection of preconditions is continuously ongoing without perceptibly delaying a real-time chat session (or other SCMC communication session). Accordingly, these frustration preconditions are not full-blown text analytics, which is a relatively time-consuming process.

Figure 3B:
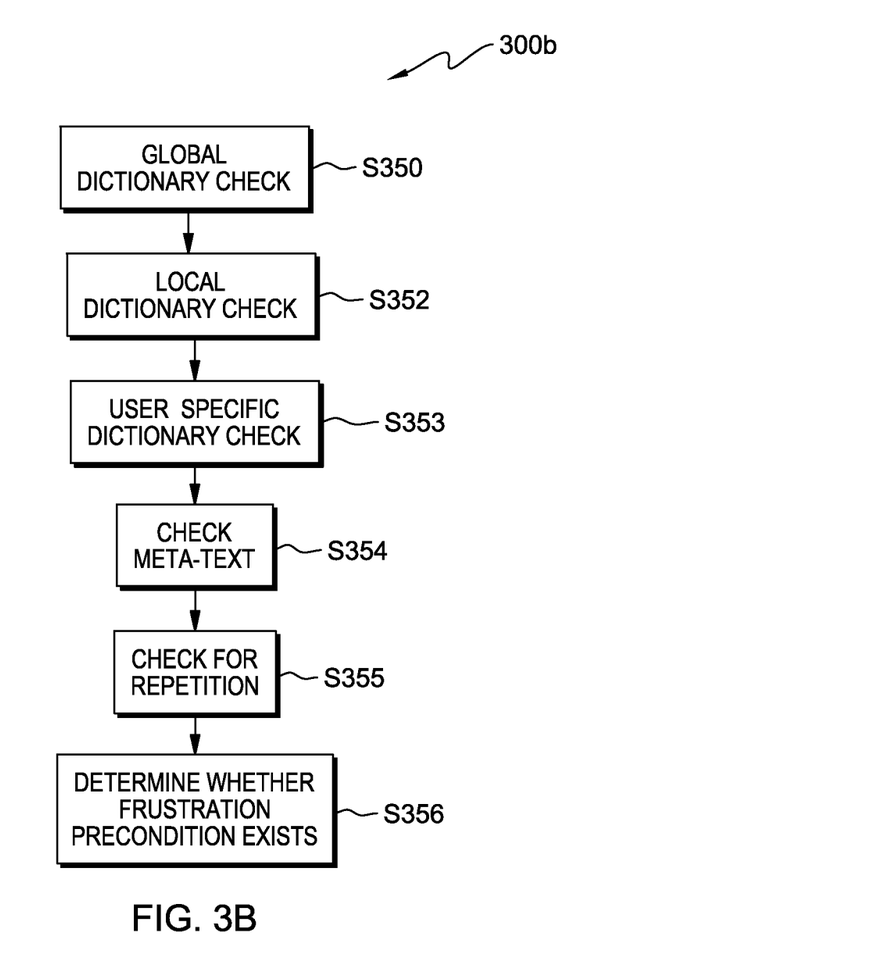
FIG. 3B is a flowchart showing a process according to an embodiment of the present invention.

FIG. 3B is a flowchart depicting step S300b for detecting a frustration precondition in accordance with an embodiment of the present invention. The various sub-steps of step S300b will now be discussed in turn. Process 300b begins at step S350, where global dictionary check sub-module 450 of detect frustration precondition mod 404 (see FIG. 4A) parses an ongoing chat for key phrases included in global dictionary 408 (see FIG. 4A).

A "key phrase" is a word or phrase designated as a potential indicator of a particular mood, such as frustration. Key phrases are maintained in global dictionary 408, local dictionary 508, and/or user-specific dictionary 510 (see FIGS. 4A and 4B). In this embodiment, some key phrases that potentially indicate frustration include: (i) frustrated; (ii) annoying; (iii) tired; (iv) do you understand (also, "do u [sic] understand," for those that use common internet-type abbreviations when they chat); (v) is this clear; (vi) I'm not sure I follow (also, "Im [sic] not sure I follow," for those that drop apostrophes when they chat); (vii) not an expert; (viii) restate that; (ix) I have no xxx idea (where xxx is a wildcard that may indicate an insertion of an additional word into the key phrase by a given communicator); and/or (x) escalate.

Global dictionary 408 (see FIG. 4A) is a collection of generally applicable key phrases that are expected to apply to any and all users in their real-time chat sessions. The key phrases included in global dictionary 408 may be established by: (i) the designer of frustration software; (ii) corporate or regional SCMC policy; and/or (iii) other organizational units, such as a particular department or business unit. When any chatter, system-wide, uses a key phrase in global dictionary 408 it will be determined (and determined relatively quickly) at step S300b that a frustration precondition had indeed been met (unless that determination is overridden by local dictionary 508 or user-specific dictionary 510 as will be discussed below).

Processing proceeds to step S352, where local dictionary check sub-module 550 parses an ongoing chat for key phrases included in local dictionary 508.

A user may establish key phrases, specific to that user, that are not included in global dictionary 408 (or to override the global dictionary). These "local-user-specific key phrases" are entered into local dictionary 508 (see FIG. 4B). The local-user-specific key phrases are applicable during all chats of the user of client sub-system 104 (see FIGS. 1 and 2B), regardless of whom the local user is chatting with. In this way, the local user can fill in perceived gaps in the list of key phrases in global dictionary 408. When the local user of client sub-system 104 is chatting with any other user who uses a key phrase in local dictionary 508, it will be determined (and determined relatively quickly) at step S300b that a frustration precondition had indeed been met (unless that determination is overridden by user-specific dictionary 510 as will be discussed below). Also, using local dictionary 508, a user can override a key phrase in the global dictionary so that a key phrase in the global dictionary, which would normally be taken as a frustration precondition at step S300b, is not taken as a frustration precondition.

Processing proceeds to step S353, where user-specific dictionary check sub-module 552 parses an ongoing chat for key phrases included in user-specific dictionary 510.

If the user knows of text-based frustration indicators for a particular chat participant, she enters those key phrases into user-specific dictionary 510. More specifically, as shown in FIG. 4B, the user-specific dictionary includes sub-dictionaries A (reference numeral 560), B (reference numeral 580), C (reference numeral 585) respectively corresponding to each other user with whom the local user has chatted. For example, the local user (herein sometimes called user D) recognizes that user B is becoming frustrated whenever user B uses the term "gotcha" during a chat session. User D can enter the term "gotcha" into user-specific sub-dictionary B 580 (see FIG. 4B) as a key phrase specific to her chats (on client sub-system 104) with user B only. In this example, when user B uses the word "gotcha" in a chat with user D, then at step S300b (see FIG. 3A) it will be determined (and determined relatively quickly) that a frustration precondition had indeed been met. Also, using user specific dictionary 510, a user can override a key phrase in the global dictionary and/or local dictionary so that a key phrase in the global and/or local dictionary, which would normally be taken as a frustration precondition at step S300b, is not taken as a frustration precondition.

The "dictionaries" 408, 508, and 510 do not generally define words, but, rather, are tables where each key phrases table entry is recorded with several support fields of associated information including the following support fields: (i) an indication of how strongly the key phrase indicates potential frustration; (ii) context hints for aiding in the text analytics analysis (to be discussed below); (iii) proposed responses for situations where the key phrase has been used; and/or (iv) override information (see above discussion of overriding of one dictionary by another dictionary). Not every key phrase will have corresponding information in all (or even in any) of the support fields, but the support fields are available in this particular embodiment to help demonstrate some of the sophisticated techniques that are used in some embodiments of the present invention.

Figure 4A:
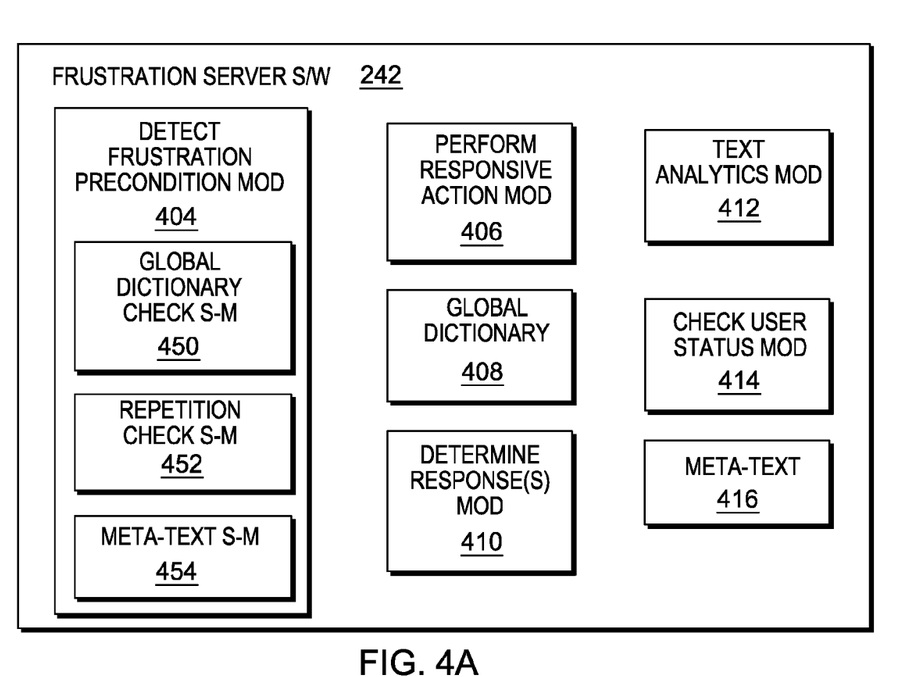
FIG. 4A is a schematic view of a frustration server software portion of the first embodiment computer system.
Figure 4B:
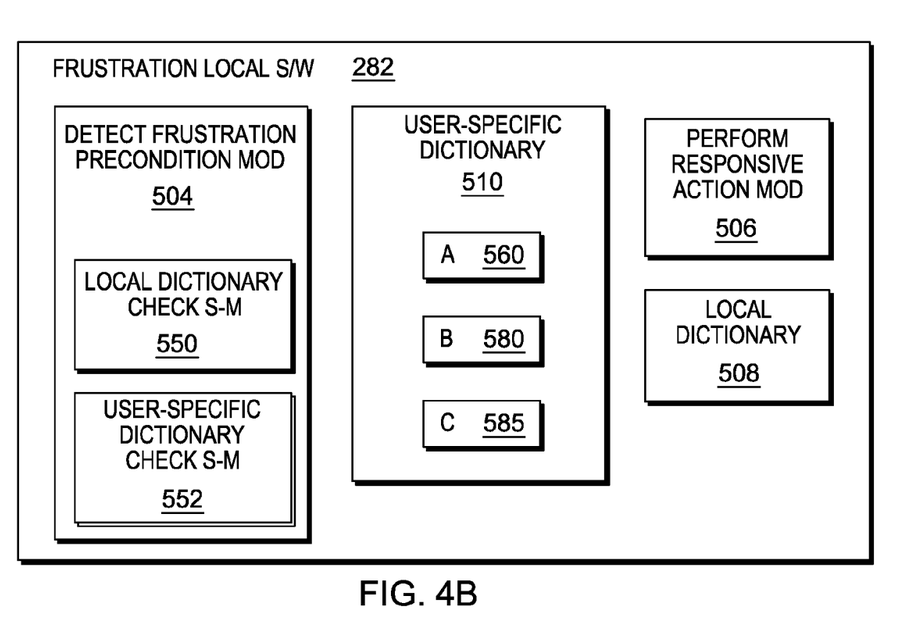
FIG. 4B is a schematic view of a frustration local software portion of the first embodiment computer system.

Processing proceeds to step S354, where meta-text check sub-mod 454 parses an ongoing chat for meta-text stored in meta-text database 416 (see FIG. 4A). A meta-text is a character, string of characters and/or a set of formatting that is potentially indicative of a mood, such as frustration, either by formatting or by sequential arrangement, such as emoticons. Meta-texts are stored in meta-text database 416 (see FIG. 4A). Examples of meta-texts that indicate frustration include: (i) some threshold amount of text in all capital letters; (ii) emoticons showing frustration; (iii) some threshold amount of exclamation point ("!") punctuation; (iv) some threshold amount of bold text; (v) large font size; and/or (vi) highlighted text. This is by no means an exhaustive list of meta-text frustration preconditions, but merely an exemplary list to help the reader understand how meta-text frustration preconditions are different than the key phrase type of frustration precondition discussed above.

Processing proceeds to step S355, where repetition check sub-module 452 (see FIG. 4A) parses an ongoing chat for repetition of words and/or phrases. Repetition of words and/or phrases indicates a stalled conversation. The potential for frustration is reasonably detected where words and phrases are repeated. Repetition check sub-mod 452 (see FIG. 4A) is included in detect frustration server software 242 because of the likelihood that repetition will indicate frustration. When other moods are the subject of detection, there may be no repetition check sub-mod 452, but another related sub-mod may be included depending on the particular mood to be detected.

Processing proceeds to step S356, where detect frustration precondition mod 404 (see FIG. 4A) determines whether or not a frustration precondition exists based upon the checks performed at steps S350, S352, S353, S354 and S355. As explained in detail above, this check for preconditions of step S300b involves cooperation and communication between server computer 200 (and its frustration server software 242) and chat member computer 250 (and its frustration local software 282). In this way, the detection of the frustration precondition can draw on insights made and coded at both the global level (that is, the server level) and the user level.

When a frustration precondition (for example, a key phrase, meta-text, or repetition) is identified in the ongoing chat by mod 404, process 300a (see FIG. 3A) advances to step S303, where text analytics module 412 (see FIG. 4A) performs text analytics on (at least a portion of) the text of the on-going chat session in order to attempt to make a more accurate determination of whether the potential for frustration truly exists in the users undertaking the on-going chat. Text analytics mod 412 includes commercially available add-on software for contextual analysis of chat transcripts and/or customized context helpers.

Examples of commercial text analysis engines include: (i) VisualText® (a product and/or service of Text Analysis International, Inc. of Palo Alto, Calif. USA); and (ii) Salience Engine™ (a product and/or service of Lexalytics, Inc. of Amherst, Mass. USA). The term(s) "VisualText" and "Salience Engine" may be subject to trademark rights in various jurisdictions throughout the world and are used here only in reference to the products or services properly denominated by the marks to the extent that such trademark rights may exist). As a further example of currently-commercially-available text analytics support products and/or services, an internet publication discloses as follows: "[There exist solutions] built upon technologies unique to IBM: LanguageWare™ (LW) and IBM Content Analytics (ICA). Both are flexible and extensible natural language processing solutions that: Provides an easy to use environment for capturing the knowledge of your business domain experts into dictionaries and semantic rules for re-use Allows customizable Information Extraction for logical reasoning to draw inferences from natural, unstructured communications Offers Entity & Relationship Recognition to classify words or phrases into categories that can be analyzed for business meaning Fits seamlessly into existing e-mail, instant messaging, business intelligence, and various other desktop or mainframe applications."

Text analytics mod 412 applies text analytics methods (as now known and/or to be developed in the future) to the chat transcript to understand the context in which the frustration precondition(s) arose. This application of text analytics determines, in a relatively processing-intensive, but potentially more accurate, way: (i) that there is, in fact, potential frustration; and/or (ii) a potential cause of the potential frustration.

In addition to its built-in capabilities text analytics mod 412 may access the various dictionaries (which may include context hints respectively associated with key phrases, as mentioned above) and frustration precondition data to assist in making frustration determinations and/or cause of frustration determinations in the most accurate manner feasible and/or possible. Context hints, when available, provide contextual clues for determining whether or not the specified key phrase indicates frustration. For example, the key phrase "defeated" may not indicate actionable frustration in the context of sports, even if it is generally indicative of potential for frustration in non-sports contexts. Accordingly, global dictionary 408 may include a context hint in the entry for "defeated" explaining, in machine readable language, that "defeated" is not indicative of frustration in a chat which has the subject matter of some kind of sport. Because the enterprise or user can customize the dictionaries, these context hints effectively allow the user to have some influence over the operation of the complex text analytics processes, at least when such processes were set in motion by the detection of a suspect "key phrase."

Similarly, because the dictionaries have a field for frustration strength associated with a key phrase, and because the text analytics mod has access to this information, the enterprise and/or user can customize the dictionaries to assist the text analytics engine. For example, the word "bloody" may indicate potential for frustration (and even a serious etiquette breach) in some circumstances, but a chat system for paramedics may customize this term to have a very low frustration potential associated with it because of the fact that the paramedics frequently deal with blood in the normal course of their professional business.

Text analytics mod 412 may also use meta-text in its text analytics analysis, but it does not necessarily do so, depending upon the text analytics engine that powers mod 412. Similarly, repetition of words and/or phrases may or may not be used by mod 412 depending upon the text analytics engine that powers mod 412.

When text analytics module 412 confirms the extant potential for frustration that was initially indicated by frustration precondition at step S300b, mod 412 goes on to attempt to determine the cause of the potential frustration. In that way, appropriate responses can be prepared, as will be discussed further below. Types of causes of potential frustration detected by mod 412 include: (i) subject matter content; (ii) language; (iii) subject matter clarity; (iv) vocabulary/reading level; and (v) etiquette.

Subject matter content caused potential frustration arises when the subject matter of the chat transcript is substantive content that is likely to cause the people chatting about the subject matter to feel frustrated, such as a recent tragic or difficult event. In some cases, actual frustration is detected, but the frustration is an expected emotion based on the topic of the chat. For example, a tsunami has taken many lives and the chat participants are voicing their frustration over the event. Frustration will be detected (as a precondition in step S300b and again as a matter of analytics at step S303, but text analytics module 412 will determine that the type of frustration is subject matter content frustration.

Language caused frustration may occur when the language of the chat session is not the first language (or most comfortable language) of one or more of the participants. When a chat participant struggles with understanding the language being used, one or more of the chat participants may become frustrated as chatting continues.

Subject matter clarity caused frustration is distinguished from subject matter content caused frustration, discussed above, in that the source of frustration is the subject matter not being explained clearly or the recipient of the information not understanding what is being written. This may arise when a difficult topic, such as Einstein's theory of relativity is being discussed. As will be discussed below in an extended example, subject matter clarity caused frustration can also arise in the context of computer use and/or diagnostic procedures, insurance billing procedures and the like because these procedures tend to be, by their nature, complex, difficult to understand and difficult to explain clearly.

Vocabulary/reading level caused frustration arises when there is a gap between the respective vocabulary or reading levels of the chat participants.

Etiquette caused frustration occurs when chat etiquette is not followed. For example, typing in all capital letters, which customarily expresses yelling and/or anger, may lead to etiquette frustration. While a lapse in etiquette may indicate some other underlying problem (such as vocabulary/reading level caused frustration), it may simply be that the party breaching etiquette simply does not know the etiquette. For example, a person who does not often engage in on-line chat may not know that typing in ALL CAPS is perceived as something akin to raising one's voice in a face-to-face conversation.

As shown in FIG. 3A, when context analysis finds no frustration, process 300a returns to step S301. In embodiments where the chat is suspended while text analytics analysis is being performed, the chat will no longer be suspended. In these embodiments, the fact that detection of preconditions (step S300b) prevents text analytics step S303 from occurring all the time will help reduce the number of these suspensions so that the chat does not depart too far from a real-time basis. On the other hand, in embodiments where the chat is not suspended while the (potentially time-consuming) text analytics of step S303 are performed, there will potentially be a lag between the time that potential frustration becomes evident and the time that responses (to be discussed in the following paragraphs) can be made to any potential frustration confirmed at text analytics step S303.

If potential frustration is confirmed at step S303, then process 300a proceeds to step S304, where determine response(s) module 410 (see FIG. 4A) determines an appropriate response, or responses, to prevent or alleviate frustration. Some specific possible types of responses will be discussed below in connection with steps S305 and S306. To determine the optimal response(s), response mod 410 receives as inputs: (i) employment data (from check user status mod 414, which obtains information from various data sources of the enterprises (not shown) through network 110 (see FIG. 1)); (ii) text analysis data (from text analytics mod 412); and/or (iii) dictionary data (from dictionaries 408, 508, 510 (see FIGS. 4A and 4B)).

Employment data for chat participants includes data such as title, tenure, and expertise. For example, the response of bringing in a subject matter expert may be inappropriate where one of the chat participants is designated as an expert in the employment records. Employment data also provides information related to the reporting structure of the chat participants. It is informative to recognize situations where the manager of a frustrated chat participant is already participating in the chat.

Determine response mod 410 receives text analysis data including: (i) type of cause of potential frustration (as discussed above in connection with step S303); and/or (ii) frustration precondition data. The type of cause of the potential frustration can influence the choice of response, as can the identity of the frustration precondition detected at step S300b.

As mentioned above, dictionaries 408, 508, 510 may be populated with recommended responses that are respectively associated with key phrases. Recommended responses are identified as intervention actions to take if the key phrase or other indicator is determined to be used in the context of frustration. A specific dictionary entry providing response support for a given key phrase may be taken by determine responses mod 410 to pre-empt further processing of suggested responses because the customized information in the dictionary may be the best guide to an optimal response.

After appropriate response(s) are determined at step S304, process 300a proceeds to step S305, where the software of perform responsive action modules 406, 506 (see FIGS. 4A and 4B) operates to implement the determined response(s) determined at step S304. Responsive actions may be performed by frustration server software 242 (mod 406) and/or frustration local software 282 (mod 506) depending on the actions that need to be performed to implement the response(s).

In this embodiment, possible types of responsive actions include: (i) ignore the detected frustration; (ii) providing suggested actions to one or more chat participants regarding actions that the chat participant can take; and/or (iii) taking direct action, such as providing a translation of a key phrase into the native language of a user. A specific example of response type (ii) (suggestion to the user(s)) will be discussed below in connection with FIG. 5A.

A specific example of type (i) (no responsive action) will now be discussed. As mentioned above, where a recent (or on-going) tragedy is being discussed, frustration may well be detected both as a precondition and again, under the more sophisticated text analytics analysis. However, if the tragedy causes subject matter content frustration (like the tsunami mentioned above) then there is really nothing the software can do to alleviate the frustration and it is probably best to just allow the chat participants to express their frustration through the chat. It may well be healthy and cathartic for them to chat, even with unmistakable indications of potential (or even realized) frustration. In this case, the response type (i) (no responsive action) is best.

A specific example of type (iii) (direct action) will now be mentioned. If a frustrated user is using ALL CAPS then the software might respond by displaying the ALL CAPS text as lower case text on the displays of the other chat participant(s). In this case, no action is required on the part of any user. Rather, the software handles the entire response.

Process 300a proceeds to step S306, where one or more users respond to suggested actions provided by the responsive action module. Responding to suggested actions may be interactive, and involve co-operation, between a chat participant and the frustration software. For example, a list of actions may be provided from which the user selects the action and the software acts on the selection. In some cases, as noted above, there may be no action taken in step S306, because all appropriate action was taken directly by the chat frustration software at step S305, or because there is no responsive action to be taken. Regardless of the action taken, process 300a returns to step S301, where chat session continues and mood detection proceeds.

Figure 5A:
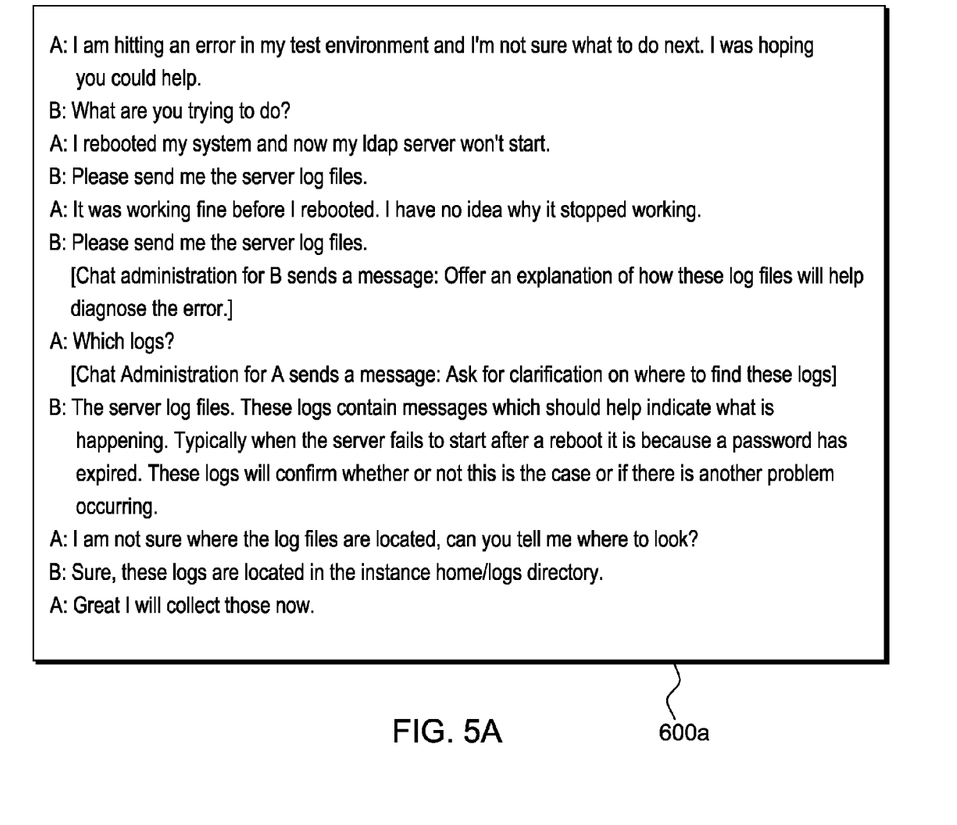
FIG. 5A is a first chat transcript, generated on, and partially under control of, the first embodiment computer system.

FIG. 5A shows chat transcript 600a generated according to process 300a. As the top section of the chat transcript shows, A and B are discussing a computer program problem. More specifically, B is trying to help A with a computer problem that A is having. In the first five entries in the chat, no frustration preconditions are detected, meaning that: (i) processing stays in steps S301 and S300b of process 300a (see FIG. 3A); and (ii) the time and processor intensive process of text analytics is not involved because of the lack of potential frustration preconditions.

However, in the sixth entry, B repeats the request "Please send me the server log files." This means that step S300b will detect a potential frustration precondition based on repetition (see FIG. 3B at steps S355 and S356). This means that processing proceeds to step S303 of process 300a (see FIG. 300a), where text analytics is invoked. The text analytics analysis of step S303 determines that there is indeed potential frustration and that this potential frustration is being caused by subject matter clarity issues. More specifically, chat participant A is not clear on why the server log files are important and/or where to find them. Step S304 of process 300a determines two responses as follows: (i) a message to chat participant B suggesting that B explain the importance of the server log files; and (ii) a message to chat participant A suggesting that A ask B where the server log files are located. At step S305 (see FIG. 3A), and as shown in FIG. 5A, these suggestions are made by the software, separately to each chat participant. At step S306 (see FIG. 3A) the chat participants respond by following the suggestions provided by the software. As shown in FIG. 5A, when the chat participants do follow the software's suggestions, then the potential frustration is resolved quickly and in a productive manner. As an alternative on this example, the software could have been programmed to automatically provide A with an explanation of the importance of the server log files, and also an explanation of where the server log files are located.

Figure 5B:
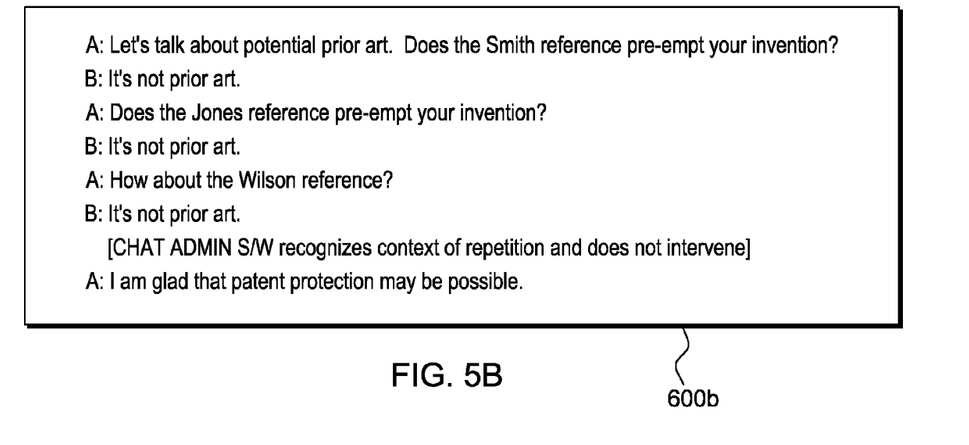
FIG. 5B is a second chat transcript, generated on, and partially under control of, the first embodiment computer system.

Screen shot 600b in FIG. 5B depicts a chat transcript that includes the frustration precondition of a repeated phrase, specifically the phrase: "It's not prior art." As discussed above, step S300b of process 300a cause the text analytics of step S303 to be performed on this chat transcript after the second or third repetition of the repeated phrase. However, unlike the example of transcript 600a, discussed above, the repetition here does not really indicate potential frustration. Rather, the text analytic engine would not determine any potential frustration here because the repetition is natural, productive and responsive, as would be understood when one has the full understanding and insight into a conversation that text analytics can provide. For this reason, step S303 would send processing back to step S301. However, this example demonstrates why it can, in some embodiments, be advantageous to do both: (i) the quick check for frustration preconditions; and (ii) a relatively time and processor intensive, separate check for potential frustration based upon text analytics. As transcript 600b shows, this scheme can be an advantage even in situations where no potential frustration is ultimately found.

Another feature of the user-specific dictionary 510, which was not used in process 300a will now be explained. The user may also enter communication preferences into these user-specific user modules. When the user determines that a particular contact prefers speaking by phone, the user may enter such a preference in the dictionary associated with that particular other user. In that way, when the user reaches out to the other user by chat, the user-specific module will invoke a message from the chat administrator notifying the user of the contact's preference to discuss matters by phone.

For example, user A has worked with user B in the past. User A noted during the last discussion that User B prefers to speak by telephone rather than chat. User A records in his User B mod of his user-specific dictionary that User B prefers to speak by telephone. When User A attempts to contact User B by chat, a phone icon appears on User A's screen to indicate that User B prefers to speak by phone. When User B joins the chat and abruptly asks for a phone call, User A is prepared for that type of response from User B and graciously agrees to get on the phone. In this case, both parties avoid a frustrating experience and communication lines remain open. As a further example of the operation of an embodiment of the present invention, a message is generated to request available times for a call for both parties.

III. Further Comments and/or Embodiment(s)

Some embodiments of the present invention provide a method to circumvent potential frustrations in chat-based communication. In some embodiments of the present invention a service and/or software application monitors a chat for: (i) key phrases such as: (a) "do you understand," and/or (b) "is this clear; (ii) repeated phrases (signals that the conversation has stalled); and/or (iii) signs of frustration such as: (a) bold text, (b) text color, and/or (c) excessive punctuation.

Some embodiments of the present invention include intervention in the conversation if progress is not made. Intervention may include providing options such as: (i) translating the information in another language; (ii) signaling to the communicator to try another method of communication; and/or (iii) suggesting ways to rephrase the information being shared.

An example chat session where "context" alone (not repetition and not key phrase) causes a response by the prevention of frustration software is shown below. In the example, C and D have communicated in the past and C has recorded the contact preference for communicating with D as "by phone." Chat session proceeds as follows:

C: Hi D, can you help me with something?
[phone icon appears as the communication preference for this contact]
D: Hi C, let's set up a call for later today to discuss this further. What time is best for you?
C: 1:30 PM EST would be good.
D: Great I will call you then, at your desk #.
C: Thanks.

Some embodiments of the present invention include an option for chat participants to subscribe their chat to the mood monitoring service. The initiator and recipient may have an option to either use their local signal dictionary or a global signal dictionary. The initial signal dictionary would be populated with key phrases and visual indicators that signal a conversation has stalled. These key phrases and indicators may include things such as: (i) font size; (ii) style; (iii) color; (iv) punctuation; (v) emoticons; (vi) geography relative to each chat participant (as an indication of language barriers); and (vii) common phrases such as: (a) "Do you understand," and (b) "Is this clear."

Some embodiments of the present invention include a signal dictionary that looks for patterns of communication including: (i) repeated phrases; and/or (ii) questions. The initial signal dictionary may be dynamically updated. For example, chat participants could update the initial signal dictionary with: (i) phrases; (ii) contexts; and/or (iii) indicators based on their experiences and communications.

Some embodiments of the present invention include a process such that when the chat is initiated, a service would run that monitors for mood-indicating signals. Once a communication stall pattern has been identified in a conversation, the chat participants would have a private message displayed in their chat window that would offer a series of options. The displayed options may include, but are not limited to: (i) suggestions for rephrasing the information; (ii) translation service options; (iii) adding an additional chat participant (such as a topic SME, manager or team lead); and (iv) suggestions for using an alternate communication method including: (a) presenting a visual diagram, (b) capturing a screenshot, (c) switching to a conference call or live session.

Some embodiments of the present invention allow the user to build a set of historical communication preferences by contact. This may be an extension to the service configuration similar to saving chat history. This allows the user to record the effective communication methods used with their contacts. These could be indicated with a set of icons next to the contact name that would indicate that translation services are required for the contact or that communication is preferred by a phone call instead of an instant message conversation.

Some embodiments of the present invention may be implemented for bidirectional real-time communication. The implementation may include a method to analyze chat-based communication in order to prevent frustration and ensure effective communication between contacts.

Some embodiments of the present invention perform real-time analysis to determine signs of stagnant communication or the potential for frustration through the use of a signal dictionary. The initial signal dictionary may be populated with key phrases and visual indicators that signal a conversation has stalled. These key phrases and indicators include: (i) font size; (ii) font style; (iii) font color; (iv) punctuation; (v) emoticons; and (vi) common phrases, such as, "do you understand?," and "is this clear?." The signal dictionary may also look for patterns of communication like repeated phrases or questions. The signal dictionary may be dynamically updated. Chat participants could update the signal dictionary with additional phrases, contexts and indicators based on their experiences and communications. This allows for signals to be personalized for an individual.

Some embodiments of the present invention address preventing frustration and ineffective communication by analyzing the real-time communication, taking account effective historical communication methods, and providing suggestions to ensure the effective flow of communication between chat participants/contacts. These options/suggestions would include but are not limited to, suggestions for rephrasing the information, translation service options, adding an additional chat participant (topic SME, manager or team lead) and suggestions for using an alternate communication method such as a visual diagram, capturing a screenshot, switching to a conference call or live session.

Furthermore, some embodiments of the present invention build a set of historical communication preferences by contact. This would be an extension to the service configuration similar to saving chat history. This would allow someone to record the effective communication methods used with their contacts. These could be indicated with a set of icons next to the contact name which would indicate that translation services are required for this contact or to schedule a call instead of discussing through instant message.

Some example key phrases follow, along with respectively associated frustration-prevention responses relating to the specific key phrase and/or respectively associated helpful context information relating to the specific key phrase.

Key Word/Phrase: "Do you understand?" may include phrase context as "repeated phrase" and noted responses may be "Try rephrasing the information or provide an example" and/or "Ask the participant to explain in their own words what they understood."

Key Word/Phrase: "Is this clear?" may include responses: "Restate required actions" and/or "Ask if further explanation or clarification is needed."

Key Word/Phrase: "I'm not sure I follow" may include the response: "Suggest a live session or phone call to discuss."

Key Word/Phrase: "I'm not an expert on that topic" may include the response: "Invite an SME or another chat participant."

Key Word/Phrase: "frustrated?" may include phrase context as "I am," "feeling," and/or "totally."

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: non-exclusive or; for example, A and/or B means that: (i) A is true and B is false; or (ii) A is false and B is true; or (iii) A and B are both true.

User/chat participant: includes, but is not necessarily limited to, the following: (i) a single individual human; (ii) an artificial intelligence entity with sufficient intelligence to act as a user; and/or (iii) a group of related users.

Simple check: any check on a body of text that is substantially less rigorous than text analytics.

What is claimed is:

1. A computer program product, for monitoring a synchronous computer-mediated communication in which a text transcript is generated by at least two chat participants including a first chat participant and a second chat participant, the product comprising software stored on a non-transitory software storage device, the software comprising:
    first program instructions programmed to set up and maintain a synchronous computer-mediated communication system between a plurality of chat participants;
    second program instructions programmed to check for potential frustration including checking the text transcript for use of a text-based signal in a list of text-based signals; and
    third program instructions programmed to take a responsive action based at least in part upon a potential cause of the potential frustration determined by performing a text analytics analysis on the text transcript;
    wherein:
    the responsive action is designed to alleviate frustration of the second chat participant;
    the list of text-based signals is recorded in a user-specific dictionary being customizable by the first chat participant to include participant-specific text-based signals corresponding to the second chat participant; and
    the user-specific dictionary being customizable to indicate a participant-specific potential frustration precondition corresponding to the second chat participant during a chat session between the first chat participant and the second chat participant.

2. The product of claim 1 wherein the responsive action includes automatically, and under software control, making a suggestion to at least one of the at least two chat participants with respect to how the communication may be conducted.

3. The product of claim 1 wherein the synchronous computer-mediated communication session is a chat-protocol-based synchronous computer-mediated communication session.

4. The product of claim 1 wherein the synchronous computer-mediated communication session is a real-time communication session.

5. A computer program product, for monitoring a synchronous computer-mediated communication in which a text transcript is generated by at least two chat participants including a first chat participant and a second chat participant, the product comprising software stored on a non-transitory software storage device, the software comprising:
    first program instructions programmed to perform a simple check on the text transcript for existence of a potential frustration precondition, the simple check includes checking a set of at least one table for a list of text-based signals to identify in the text transcript a text-based signal on the list of text-based signals;
    second program instructions programmed to, on condition that a potential frustration precondition is found, perform a first text analytics analysis on the text transcript to determine whether potential frustration is evidenced by the text transcript; and
    third program instructions programmed to, responsive to potential frustration being evidenced by the text transcript, take a responsive action based at least in part upon a potential cause of the potential frustration determined by performing a second text analytics analysis on the text transcript;
    wherein:
    the responsive action is designed to alleviate an occurrence of potential frustration for the second chat participant;
    the set of at least one table includes a user-specific table that is customizable by the first chat participant to include participant-specific text-based signals corresponding to the second chat participant; and
    the user-specific table being customizable to indicate a participant-specific potential frustration precondition corresponding to the second chat participant during a chat session between the first chat participant and the second chat participant.

6. The product of claim 5 wherein the responsive action includes automatically, and under software control, making a suggestion to at least one of the at least two chat participants with respect to how the communication may be conducted.

7. The product of claim 5 wherein the first program instructions are further programmed to check for a threshold amount of repetition of the text-based signal in the text transcript, with the threshold amount of repetition being a frustration precondition.

8. The product of claim 5 wherein the first program instructions are further programmed to check meta-text in the text transcript for meta-text corresponding to a predetermined frustration precondition.

9. A computer system for monitoring a synchronous computer-mediated communication in which a text transcript is generated by at least two chat participants including a first chat participant and a second chat participant, the computer system comprising:
    a processor set; and
    a software storage device;
    wherein:
    the processor set is structured, located, connected or programmed to run software stored on the software storage device; and
    the software comprises:
        first program instructions programmed to perform a simple check on the text transcript for existence of a potential frustration precondition, the simple check includes checking a set of at least one table for a list of text-based signals to identify in the text transcript a text-based signal on the list of text-based signals;
        second program instructions programmed to, on condition that a potential frustration precondition is found, perform a first text analytics analysis on the text transcript to determine whether potential frustration is evidenced by the text transcript; and
        third program instructions programmed to, responsive to potential frustration being evidenced by the text transcript, take a responsive action based at least in part upon a potential cause of the potential frustration determined by performing a second text analytics analysis on the text transcript;

wherein:

the responsive action is designed to alleviate an occurrence of potential frustration for the second chat participant;

the set of at least one table includes a user-specific table that is customizable by the first chat participant to include participant-specific text-based signals corresponding to the second chat participant; and the user-specific table being customizable to indicate a participant-specific potential frustration precondition corresponding to the second chat participant during a chat session between the first chat participant and the second chat participant.

10. The system of claim 9 wherein the responsive action includes automatically, and under software control, making a suggestion to at least one of the at least two chat participants with respect to how the communication may be conducted.

11. The system of claim 9 wherein the first program instructions are further programmed to check for at least one of the following conditions:

a threshold amount of repetition of the text-based signal in the text transcript, with the threshold amount of repetition being a frustration precondition; and meta-text in the text transcript for meta-text corresponding to a predetermined frustration precondition.

12. The system of claim 9, the software further comprising:

fifth program instruction programmed to, on condition that the secondary keyword is found in the text transcript, determining that potential frustration is evidenced by the text transcript.

13. The system of claim 9, wherein the responsive action includes automatically, and under software control, taking direct action.

14. The system of claim 9, wherein:

the set of at least one table includes a global table and a local table;

the global table includes a set of global text-based signals pre-determined by a group policy; and the local table includes a set of local text-based signals input by a first participant to supplement the set of global text-based signals and/or to exclude a global text-based signal from the set of global text-based signals.

15. The system of claim 9, wherein:

performing a first text analytics analysis includes using a context hint provided in the at least one table, the context hint corresponding to the text-based signal; and the context hint is a contextual clue that supports a determination of whether the text-based signal indicates potential frustration as evidenced by the text transcript.

16. The system of claim 9, wherein:

the potential cause is a subject matter content type; and the responsive action is to take no action.

17. The system of claim 9, wherein the second text analytics analysis includes:

retrieving a responsive action table that includes a set of recommended responsive actions respectively corresponding to a set of text-based signals.

18. The system of claim 9, the software further comprising:

fourth program instructions programmed to, on condition that the text-based signal that indicates the potential frustration precondition is found at the performing-a-simple-check step, suspend the synchronous computer-mediated communication while the first text analytics analysis is performed on the text transcript.

19. The system of claim 9, wherein the responsive action is further based at least in part upon employment data of one of the at least two chat participants.

* * * * *